US009494451B1

(12) United States Patent
Cole

(10) Patent No.: US 9,494,451 B1
(45) Date of Patent: Nov. 15, 2016

(54) PITOT TUBE SUPPORT AND ALIGNMENT APPARATUS

(71) Applicant: Robert E. Cole, Panama City, FL (US)

(72) Inventor: Robert E. Cole, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1 day.

(21) Appl. No.: 14/670,011

(22) Filed: Mar. 26, 2015

(51) Int. Cl.
*G01F 1/46* (2006.01)

(52) U.S. Cl.
CPC ...................... *G01F 1/46* (2013.01)

(58) Field of Classification Search
None
See application file for complete search history.

(56) References Cited

U.S. PATENT DOCUMENTS

| | | | | |
|---|---|---|---|---|
| 4,056,903 A * | 11/1977 | Guarnere | ............ | E04B 2/7422 160/351 |
| 4,375,769 A * | 3/1983 | Brandt, Jr. | ............ | G01L 15/00 73/861.66 |
| 4,516,425 A * | 5/1985 | Chollet | ............ | G01P 5/165 376/203 |
| 4,703,661 A * | 11/1987 | Evers | ............ | G01F 1/46 73/861.66 |
| 5,025,661 A * | 6/1991 | McCormack | ....... | G01L 19/0007 73/180 |
| 5,601,254 A * | 2/1997 | Ortiz | ............ | G01F 1/46 244/1 R |
| 5,639,964 A * | 6/1997 | Djorup | ............ | G01P 5/00 73/170.12 |
| 6,237,426 B1 * | 5/2001 | Gryc | ............ | G01F 1/46 73/861.66 |
| 6,289,745 B1 * | 9/2001 | Bowers | ............ | G01F 1/46 73/861.66 |
| 6,957,586 B2 * | 10/2005 | Sprague | ............ | G01F 1/3209 73/204.21 |
| 7,056,085 B2 * | 6/2006 | Ponziani | ............ | G01F 1/684 415/118 |
| 8,397,565 B1 * | 3/2013 | Dillon | ............ | G01F 1/46 73/170.11 |
| 8,601,883 B2 * | 12/2013 | Strom | ............ | G01F 1/3209 73/861.24 |
| 8,733,180 B1 * | 5/2014 | England | ............ | G01F 1/46 73/861.42 |
| 8,858,074 B2 * | 10/2014 | Greenberg | ............ | G01K 1/14 374/144 |
| 2003/0145661 A1 * | 8/2003 | Taranto | ............ | G01F 1/46 73/861.65 |
| 2003/0172746 A1 * | 9/2003 | Walker | ............ | G01F 1/46 73/861.65 |
| 2014/0260671 A1 * | 9/2014 | Stehle | ............ | G01F 1/46 73/861.66 |

* cited by examiner

*Primary Examiner* — Harshad R Patel
(74) *Attorney, Agent, or Firm* — James T. Shepherd

(57) ABSTRACT

A support and alignment apparatus for a traversing pitot tube is provided. The apparatus includes a support strut, an insertion fitting and a termination fitting. The support strut spans within the duct, with each end of the strut being attached to one of the fittings. The pitot tube is routed through the insertion fitting and into the support strut. The strut supports the pitot tube as it traverses the duct. A slot cut along the length of the strut allows the pitot tube to extend away from the strut, into and parallel to the flow. The slot aligns the end of the pitot tube with the flow and prevents unwanted rotation, vibration, and flexing of the pitot tube to increase measurement accuracy.

10 Claims, 2 Drawing Sheets

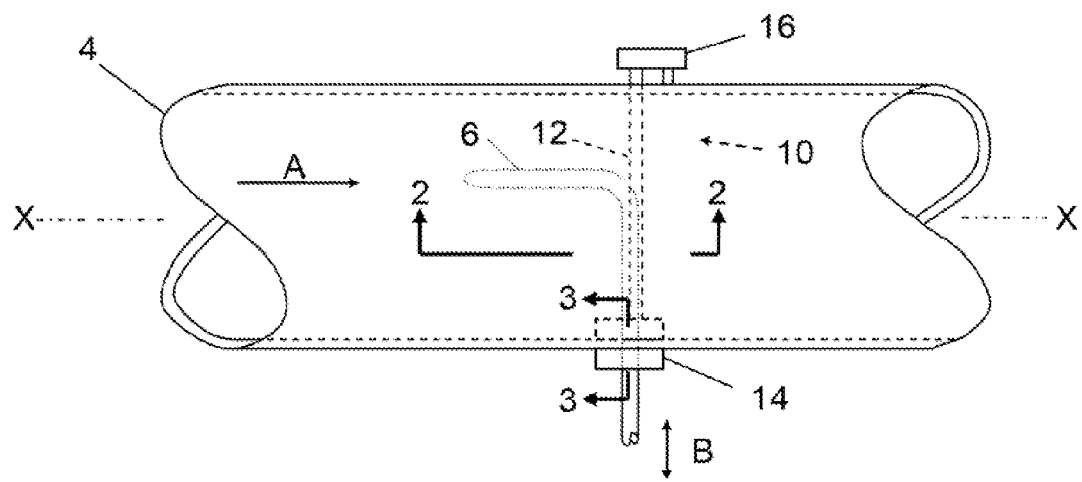
FIG. 1
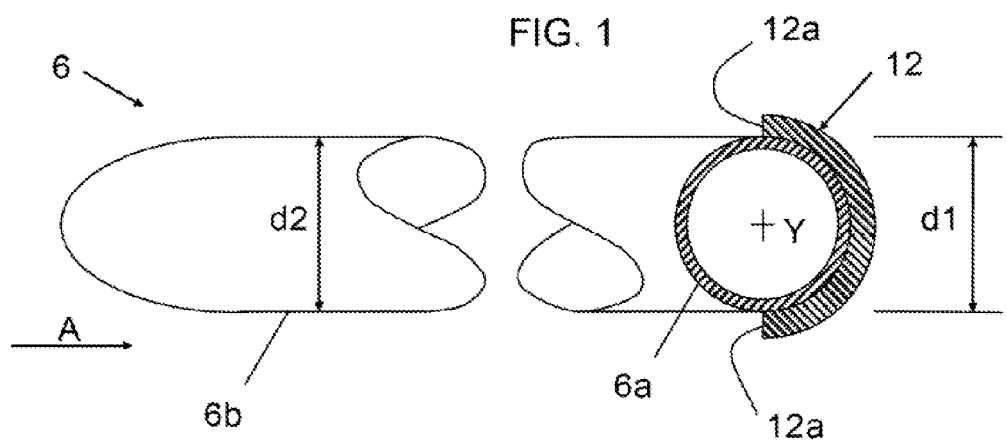
FIG. 2
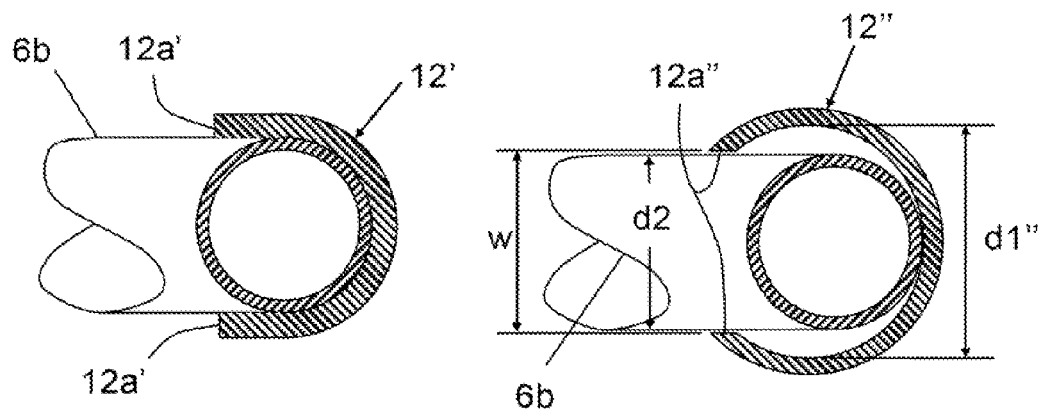
FIG. 3A
FIG. 3B

PITOT TUBE SUPPORT AND ALIGNMENT APPARATUS

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates to pitot tubes for use in flow measurement systems. More particularly, the present invention relates to support and alignment of a traversing pitot tube.

(2) Description of the Prior Art

Pitot tubes are pressure sensing instruments used to determine the velocity of fluid flows. Depending on the arrangement, they can sample total pressure, static pressure, or both pressures simultaneously. Pitot tubes are widely used as airspeed indicators in the aviation industry and as gas flow meters in industrial applications.

A pitot tube consists of a tube oriented to direct fluid flow directly into, or across an orifice. Generally, pitot tubes are configured with a right angle bend, such that one leg is perpendicular to the flow and the other leg is extends into and parallel to the flow. One or more orifices are positioned within the leg that is parallel to the flow. The orifices are then connected to pressure sensing transducers or manometers.

If the orifice is directly aligned with the flow, the pitot tube samples stagnation, or total pressure. If the orifice is aligned perpendicular to the flow, the static pressure of the fluid is sampled. A single orifice of a pitot tube allows it to measure the fluid state at a single point, vice averaging over a large area.

An alternate version of the pitot tube, known as a pitot-static tube, samples both total pressure and static pressure simultaneously. The static signal can be subtracted from the stagnation signal to determine the dynamic pressure of the flow at that location. Then, for an incompressible flow with a known density, this dynamic pressure can be used to calculate velocity in a manner well known in the art.

A common technique used for determining the velocity profile within a square or round duct is known as a pitot traverse. The pitot traverse requires that a number of pitot-static measurements are taken at specific points perpendicular to the flow within the duct. Then, the magnitudes can be plotted to determine the velocity profile.

A velocity profile is typically used to calculate the overall average velocity and mass flow rate. It can be used to identify zones of recirculation or instability resulting from upstream obstructions, or to check for fully-developed flow.

However, performing a pitot traverse measurement across a large distance within a large diameter duct or under high velocity flow is problematic. As the pitot tube samples only at a single small location, the pitot tube must be cantilevered and extended into the flow further and further to reach sample points on the opposite side of the duct. These conditions can cause the orifice on the pitot tube to wander and vibrate during the measurement, whereas precise placement of the orifice within the duct is critical to conducting a proper pitot traverse.

Current designs rely on a single end support fitting mounted to the duct wall that attempts to hold the pitot tube in place. While they do help for the near-wall measurements, they are of little benefit for far-wall measurements, where the bending moment resulting from flow drag forces on the pitot tube is the greatest.

The use of an overly-stiff pitot tube to resist bending and flutter has been tried. However, for some large duct sizes and high fluid flow velocities, the size and stiffness required is impractical and typically unavailable. Velocity averaging pitot tubes have also been tried. These pitot tubes can be made significantly stiffer and extend all the way across the duct so as to be supported on both ends. However, velocity averaging pitot tubes sample at numerous locations and average readings into one pressure signal. They do not provide the flexibility or the fidelity of the single point sample of a standard pitot. Nor can they provide detailed velocity profile data.

Vibration, or singing, of the pitot tube is another problem that must be overcome. Vibration of a pitot tube results from fluid-dynamic forces generated by the oscillating vortex sheet behind the cantilevered tube. When the frequency of these oscillations matches the natural frequency of the pitot tube system and its support, resonance occurs. The effects of vibration for a cantilevered pitot tube have been found to result in significant over-indication of pressure with increases in vibration amplitude.

Again, previous solutions have relied on making the end support and tube prohibitively stiff. Common fluid-dynamic fixes such as trailing fins or strakes are also not feasible for a traversing pitot tube, as they would prohibit or severely limit translation.

Thus, a need has been recognized in the state of the art to provide a means to increase the accuracy of a pitot tube measurement probe when measuring the mass flow rate of a fluid within a duct using a traverse sampling technique. There is also a need to provide a means to minimize bending of the pitot tube when extended across the width of a duct. A further need exists to minimize vibration of the pitot tube during such extension of the tube.

SUMMARY OF THE INVENTION

It is therefore a general purpose and primary object of the present invention to provide a support and alignment apparatus for a traversing pitot tube. The apparatus includes first and second end fittings and a support strut. The first end fitting attaches to one wall of the duct and the second end fitting attaches to the far side of the duct opposite the first end fitting.

The support strut spans within the duct, with each end of the support strut being attached to one of the end fittings. The support strut can be fabricated from a hollow tube. A slot is cut along the length of the support strut. A pitot tube is routed through the first end support fitting and into the support strut. The support strut supports the pitot tube as it traverses the duct, while the support strut slot allows the pitot tube to extend away from the support strut, into and parallel to the flow.

A compression gasket, or other form of packing, seals the hole where the pitot tube passes through the first end fitting. However, the seal is such as to permit free rotation and linear adjustment of the pitot tube within the support strut. At the second end fitting, the second end fitting can attach the support strut directly to the inner surface of the duct, or the support strut can pass through the duct wall to attach to the second end fitting.

The support strut provides a guiding channel for the pitot tube that supports the length of the pitot tube within the duct. The slot in the support strut allows the pitot tube to translate along the support strut without interference. Any vortex shedding resulting from high velocity flow emanates from the support strut itself and not from the pitot tube. Thus, vibration of the pitot tube is minimized.

The support strut slot aligns the end of the pitot tube to the direction of the fluid flow and prevents unwanted rotation of the pitot tube so that measurement uncertainty is minimized. Further, the support strut can prevent the pitot tube from bending backwards due to dynamic pressure and induced drag, so as to provide greater measurement accuracy.

In one embodiment, a pitot tube support and alignment system includes a support strut spanning perpendicularly to a longitudinal axis of a duct, a termination fitting supporting a first end of the strut adjacent to a first side of the duct and an insertion fitting supporting a second end of the strut adjacent to a second side of the duct. The insertion fitting accommodates the pitot tube through the second side of the duct, through the insertion fitting and onto the strut.

The strut supports a supported portion of the pitot tube within the duct. A measuring portion of the pitot tube extends perpendicularly from the supported portion and the strut maintains an alignment of the measuring portion of the pitot tube parallel to the longitudinal axis within the duct.

The strut can have a channel cross-section, with the supported portion of the pitot tube being supported within the channel. The measuring portion extends away from the channel, between the edges of the channel. The edges constrain the measuring portion to maintain its alignment within the duct.

The channel can have a semi-circular shape, with an inside radius conforming to the outside radius of the supported portion of the pitot tube. The cross-section can also be a u-shape, with the edges extending a distance adjacent the measuring portion.

The cross-section can also be fabricated from a slotted tube, with a distance between the aforesaid edges forming the slot. In this configuration, the distance between the edges conforms to the outside radius of the measuring portion.

The termination fitting can include a threaded portion affixed to the end of the strut and a mating portion. The mating portion can engage with the threaded portion, such that threading the mating portion onto the threaded portion moves the mating portion into contact with the outside of the duct. Further rotation of the mating portion serves to apply a tension force on the strut.

The threaded portion can include a plate extending parallel to the outside face of the duct. The plate can include a first bore, with the strut extending through the bore and being fixed therein. The plate can include a threaded bore distant from the first bore for accommodating the mating portion.

The insertion fitting can include a threaded portion extending through the side of the duct and into the duct, with the strut being affixed to the threaded portion. The pitot tube can be inserted through the threaded portion and onto the strut. The insertion fitting also can include a flange affixed to the threaded portion, with the flange abutting an outside surface of the side of the duct. A nut mates with the threaded portion and abuts the inside surface of the duct upon tightening the nut on the threaded portion.

A seal is provided between the flange and the pitot tube and between the threaded portion and the pitot tube. In one embodiment, the seal can include a gasket abutting the flange and the threaded portion, with the pitot tube being inserted through the gasket. In another embodiment, the seal can be packing material, with the packing material being placed about the pitot tube after the pitot tube is inserted through the threaded portion.

In one embodiment, a system in combination with a pitot tube can include a support channel spanning perpendicularly to a longitudinal axis of a duct and fixed to the duct at respective ends of the channel. The pitot tube can be supported within the channel, with a measuring portion of the pitot tube extending away from the channel between edges of the channel. The edges constrain the measuring portion so as to maintain an alignment of the measuring portion parallel to the longitudinal axis of the duct.

The system can include an insertion fitting supporting a first end of the channel adjacent to a first side of the duct. The insertion fitting accommodates the pitot tube through the side of the duct, through the insertion fitting and onto the channel. The system can also include a termination fitting to support the other end of the channel adjacent to the other side of the duct.

The insertion fitting can include a threaded portion extending through the side of the duct and into the duct. The channel is affixed to the threaded portion, with the pitot tube being inserted through the threaded portion and onto the channel. A flange is affixed to the threaded portion. The flange abuts the outside surface of the duct. A nut mates with the threaded portion and abuts the inside surface of the duct upon tightening the nut on the threaded portion. A seal is provided between the flange and the pitot tube and between the threaded portion and the pitot tube.

The termination fitting can include a threaded portion affixed to the other end of the channel and a mating portion engaging the threaded portion. Threading the mating portion onto the threaded portion moves the mating portion into contact with the outside face of the duct. Further rotation of the mating portion can apply a tension force on the channel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 1 illustrates a schematic view of a section of duct fitted with a support and alignment apparatus for a pitot tube;

FIG. 2 illustrates a cross-sectional view of the apparatus and pitot tube of FIG. 1, taken a line 2-2 of FIG. 1;

FIGS. 3A and 3B illustrate cross-sectional views of alternate apparatuses corresponding to FIG. 2;

DESCRIPTION OF THE INVENTION

Figure 4:
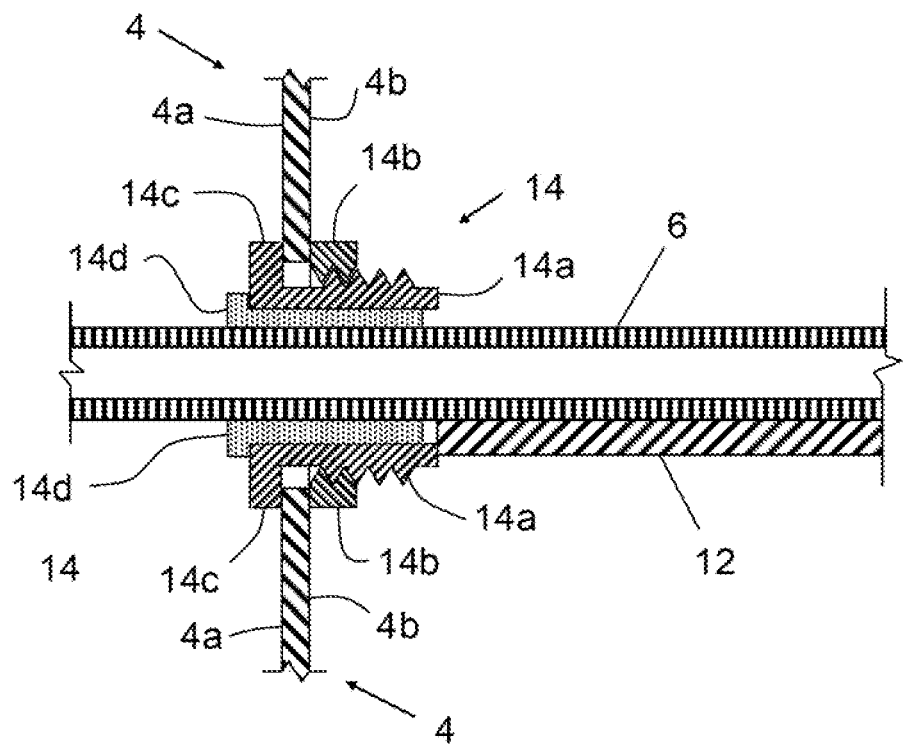
FIG. 4 illustrates a cross-sectional view of the duct and apparatus of FIG. 1, taken at line 3-3 of FIG. 1.

Referring now to FIG. 1, there is shown a schematic view of a section of duct 4 fitted with support and alignment apparatus 10 for a pitot tube 6. Hidden portions of duct 4 and apparatus 10 are shown as dashed lines in FIG. 1. For clarity and differentiation from apparatus 10, hidden portions of pitot tube 6 are illustrated as dotted lines in FIG. 1.

Support strut 12 of apparatus 10 spans across duct 4 and is secured to duct 4 via insertion fitting 14 and termination fitting 16. In operation, pitot tube 6 extends through insertion fitting 14 and into duct 4. Pitot tube 6 is bent so as to extend perpendicularly from support strut 12 in a direction parallel to longitudinal axis X-X of duct 4 and opposite flow direction shown by arrow A. Pitot tube 6 can be moved across duct 4 in either direction indicated by double arrow B. At any point along its traverse of duct 4, the weight of pitot tube 6 is supported by support strut 12. Any vortex shedding resulting from high velocity flow emanates from support strut 12 and not pitot tube 6.

Referring now to FIG. 2, there is shown a cross-sectional view of apparatus 10 taken at line 2-2 of FIG. 1. As shown in the cross-sectional view of FIG. 2, support strut 12 is formed as a channel. Supported portion 6a of pitot tube 6 rests within the channel shape of support strut 12. One or more orifices (not shown) in measuring portion 6b of pitot tube 6 obtain flow measurements of fluid flowing in duct 4 in the direction of arrow A (shown in FIG. 1). To obtain flow measurements at different points across the width of duct 4, pitot tube 6 is moved along the length of support strut 12 in either direction indicated by double arrow B (shown in FIG. 1).

In addition to supporting pitot tube 6, strut 12 can help align pitot tube 6 parallel to axis X-X. As illustrated in FIG. 2, strut 12 can be fabricated as a channel formed of a half tubular shape having an inside diameter d1 conforming to outside diameter d2 of pitot tube 6. In this configuration, edges 12a of support strut 12 constrain measuring portion 6b of pitot tube 6 from rotating about central axis Y of supported portion 6a.

Referring now to FIGS. 3A and 3B, there are shown alternate channel-shaped embodiments of support strut 12, referred to as 12' in FIG. 3A and 12" in FIG. 3B. In FIG. 3A, edges 12a' of alternate embodiment strut 12' are extended in the direction of measuring portion 6b, parallel to axis X-X of FIG. 1. In this configuration, edges 12a' can provide additional alignment support for measuring portion 6b. In FIG. 3B, inside diameter d1" of alternate embodiment strut 12" is greater than outside diameter d2 of measuring portion 6b. In this configuration, tubular support strut 12" is slotted, with edges 12a" being spaced width w apart, just sufficient for measuring portion 6b to pass therebetween. In a manner similar to that described with relation to edges 12a' of FIG. 3A, edges 12a" can provide additional alignment support for measuring portion 6b.

Referring now to FIG. 4, there is shown a cross-sectional view of insertion fitting 14, taken at line 3-3 of FIG. 1. For clarity of illustration, hidden line portions of the various objects described with relation to FIG. 4 are not shown therein. Threaded portion 14a of insertion fitting 14 passes through duct 4. Nut 14b of insertion fitting 14 can be tightened onto threaded portion 14a to secure flange portion 14c of insertion fitting 14 against outside face 4a of duct 4 and nut 14b against inside face 4b of duct 4.

Support strut 12 is secured to threaded portion 14a by such means as are known to those in the art. As an example, support, strut 12 can be welded to threaded portion 14a. As described previously with respect to FIG. 1, pitot tube 6 can be passed through insertion fitting 14 and onto support strut 12. Packing material 14d of insertion fitting 14 can form a seal about pitot tube 6. The seal is such as to permit free rotation and linear adjustment of pitot tube 6 within support strut 12.

Figure 5:
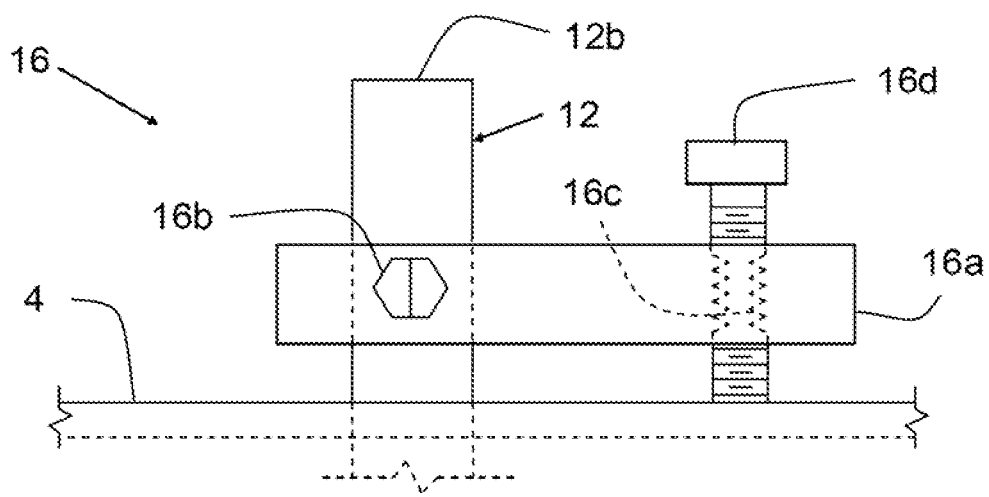
FIG. 5 illustrates a schematic top view of an end fitting of the apparatus of FIG. 1.

Referring now to FIG. 5, there is shown a schematic top view of termination fitting 16, corresponding to the view in FIG. 1. Termination end 12b of support strut 12 extends through duct 4 and through tensioning plate 16a of termination fitting 16. Tensioning plate 16a is secured to support strut 12 by such means as are known in the art. For example, set screw 16b can be used to secure support strut 12 within plate 16a.

Tensioning plate 16a extends away from support strut 12 in a direction parallel to duct 4. Termination fitting 16 includes threaded bore 16c in tensioning plate 16a, distant from support strut 12. Tensioning screw 16d of termination fitting 16 can be threaded into bore 16c until tensioning screw 16d contacts duct 4. As tensioning screw 16c is further threaded into bore 16c, plate 16a is moved further away from duct 4, resulting in tension being placed on support tube 12. This tension increases support tube 12 resistance to vibration and singing. Contact of tensioning screw 16d against duct 4 also acts to lock the angular position and alignment of support strut 12 within duct 4.

Obviously many modifications and variations of the present invention may become apparent in light of the above teachings. For example, FIGS. 2, 3A and 3B respectively illustrate support struts 12, 12' and 12" generally as channels fabricated from variations of cylindrical tubular forms. Alternate shapes of support strut 12 can be used to provide additional structural rigidity or improve aerodynamics. For example, struts 12, 12' and 12" can be channels fabricated from other tubular shapes, such as square or rectangular tubes. Further, an airfoil shape for support strut 12 can help minimize flow losses, reduce vibration and provide increased resistance to bending.

Additionally, the configuration of one or both of insertion fitting 14 and termination fitting 16 can be modified from that shown in FIGS. 4 and 5. As an example, a gasket can be used in lieu of packing material 14d to seal about pitot tube 6. As a further example termination end 12b of support strut 12 can be sealed and threaded. Thus, to tension support strut 12 in this configuration, a corresponding nut need only be tightened against duct 4.

In a further alternate configuration, multiple support struts 12 can be positioned across duct 4 within a plane perpendicular to axis X-X in FIG. 1, such that readings can be taken at various angles about axis X-X to develop a complete three dimensional profile within duct 4. Where support struts 12 intersect, notches can be provided in support struts 12 to allow traversal of pitot tube 6 along a full length of each support strut 12.

What has thus been described is a support and alignment apparatus 10 for a traversing pitot tube 6. Apparatus 10 includes support strut 12, insertion fitting 14 and termination fitting 16. Support strut 12 spans within duct 4, with each end of support strut 12 being attached to one of fittings 14 or 16. In cross-section, support strut 12 can be a channel, fabricated from a tubular shape. To form the channel of support strut 12, a slot is cut along the length of the tubular shape. Pitot tube 6 is routed through insertion fitting 14 and into support strut 12. Support strut 12 supports pitot tube 6 as it traverses duct 4, while the slot allows pitot tube 6 to extend away from support strut 12, into and parallel to the flow.

Support strut 12 provides a guiding channel for pitot tube 6 that supports the length of pitot tube 6 within duct 4. The slot in support strut 12 aligns the end of pitot tube 6 to the direction of fluid flow and prevents unwanted rotation of pitot tube 6 so that measurement uncertainty is minimized. Further, support strut 12 can prevent bending of pitot tube 6 due to dynamic pressure and drag, so as to provide greater measurement accuracy.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A pitot tube support and alignment system, comprising:
    a support strut spanning perpendicularly to a longitudinal axis of a duct having a wall with an inside face and an outside face;
    a termination fitting supporting a first end of said support strut at a first location in said wall of said duct;
    an insertion fitting supporting a second end of said support strut at a second location in said wall of said duct; and
    a pitot tube having a supported portion and a measuring portion extending perpendicularly away from said supporting portion, said pitot tube extending through said wall of said duct at said second location, through said insertion fitting and onto said support strut, said support strut supporting said supported portion within said duct, said support strut maintaining on alignment of said measuring portion parallel to said longitudinal axis within said duct;
    wherein said insertion fitting comprises (1) a threaded portion extending through said wall of said duct and into said duct at said second location, said support strut being affixed to said threaded portion, said pitot tube being inserted through said threaded portion and onto said support strut, (2) a flange portion affixed to said threaded portion, said flange portion abutting said outside face of said duct at said second location, (3) a nut mating with said threaded portion, said nut abutting said inside face of said duct at said second position upon tightening said nut on said threaded portion, and (4) a seal between said flange portion and said pitot tube and between said threaded portion and said pitot tube.

2. The system of claim 1, wherein a cross-section of said support strut comprises a channel, said supported portion being supported within said channel, said measuring portion extending away from said channel between edges of said channel, said edges constraining said measuring portion to maintain said alignment.

3. The system of claim 2, wherein said cross-section comprises a semi-circle having an inside radius conforming to an outside radius of said measuring portion.

4. The system of claim 2, wherein said cross-section comprises a u-shape having an inside radius conforming to an outside radius of said measuring portion, said edges extending a distance adjacent to said measuring portion.

5. The system of claim 2, wherein said cross-section comprises a slotted tube, a distance between said edges forming a slot, said distance conforming to an outside radius of said measuring portion.

6. The system of claim 2, wherein said termination fitting comprises:
    a tensioning plate affixed to said first end of said support strut adjacent to said outside face of said duct at said first location, said tensioning plate having a threaded bore; and
    a tensioning screw engaging said threaded bore, wherein rotation of said tensioning screw in one direction moves said tensioning screw into contact with said outside face of said duct at said first location, and further rotation of said tensioning screw in said one direction tensions said support strut.

7. The system of claim 6, wherein said tensioning plate has a first bore, said support strut extends through said first bore and is fixed therein with a set screw.

8. The system of claim 2, wherein said termination fitting comprises:
    a threaded portion affixed to said first end of said support strut and extending outside said duct; and
    a nut engaging said threaded portion adjacent to said outside face of said duct at said first location, wherein tightening said nut moves said nut to contact said outside face, and further tightening of said nut tensions said support strut.

9. The system of claim 1, wherein said seal comprises a gasket abutting said flange portion and said threaded portion, said pitot tube being inserted through said gasket.

10. The system of claim 1, wherein said seal is packing material.

* * * * *